(12) United States Patent
Sueyoshi et al.

(10) Patent No.: US 11,171,514 B2
(45) Date of Patent: Nov. 9, 2021

(54) WIRELESS POWER TRANSMISSION SYSTEM AND SHEET COIL

(71) Applicant: NITTO DENKO CORPORATION, Ibaraki (JP)

(72) Inventors: Taiki Sueyoshi, Osaka (JP); Masami Inoue, Osaka (JP); Hisashi Tsuda, Osaka (JP); Takashi Oda, Osaka (JP); Kaoru Ito, Osaka (JP); Hideshi Yamakawa, Osaka (JP); Daigo Tsubai, Osaka (JP); Toru Mizutani, Osaka (JP); Yasuyuki Ota, Osaka (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 16/492,484

(22) PCT Filed: Mar. 28, 2018

(86) PCT No.: PCT/JP2018/012834
§ 371 (c)(1),
(2) Date: Sep. 9, 2019

(87) PCT Pub. No.: WO2018/181509
PCT Pub. Date: Oct. 4, 2018

(65) Prior Publication Data
US 2020/0014246 A1 Jan. 9, 2020

(30) Foreign Application Priority Data
Mar. 31, 2017 (JP) .............................. JP2017-071263

(51) Int. Cl.
*H02J 7/02* (2016.01)
*H02J 50/12* (2016.01)
(Continued)

(52) U.S. Cl.
CPC ................ *H02J 50/12* (2016.02); *H01F 5/06* (2013.01); *H01F 38/14* (2013.01); *H02J 5/005* (2013.01)

(58) Field of Classification Search
CPC .... H02J 50/12; H02J 5/005; H02J 7/00; H02J 50/10; H01F 5/06; H01F 38/14; H01F 27/28
See application file for complete search history.

(56) References Cited

U.S. PATENT DOCUMENTS

2008/0191924 A1* 8/2008 Duff .......................... H04K 3/44
342/14
2008/0297107 A1* 12/2008 Kato ....................... H02J 7/025
320/108

(Continued)

FOREIGN PATENT DOCUMENTS

| JP | 2011-187559 A | 9/2011 |
| JP | 2012-174727 A | 9/2012 |

(Continued)

OTHER PUBLICATIONS

Apr. 24, 2018 International Search Report issued in International Application No. PCT/JP2018/012834.

(Continued)

*Primary Examiner* — Adi Amrany
*Assistant Examiner* — Esayas G Yeshaw
(74) *Attorney, Agent, or Firm* — Oliff PLC

(57) ABSTRACT

A wireless power transmission system includes a power-supplying device including an electronic oscillator that generates electric power having a frequency of 1 MHz or more and 5 MHz or less, and a power-supplying coil member in which the electric power flows; and a power-receiving device including a power-receiving coil member that is capable of generating electric power based on the magnetic field generating from the power-supplying coil (Continued)

member, wherein the power-receiving coil member is a sheet coil including an insulating layer and a first coil pattern disposed at one side of the insulating layer, the first coil pattern is composed of wires, and the wires are disposed in spaced apart relation from each other with a predetermined space provided therebetween in the radial direction of the first coil pattern.

6 Claims, 6 Drawing Sheets

(51) Int. Cl.
*H01F 5/06* (2006.01)
*H01F 38/14* (2006.01)
*H02J 5/00* (2016.01)

(56) References Cited

U.S. PATENT DOCUMENTS

| | | | |
|---|---|---|---|
| 2011/0084658 A1* | 4/2011 | Yamamoto | B60L 11/1864 320/108 |
| 2012/0212069 A1 | 8/2012 | Kawano et al. | |
| 2012/0274148 A1 | 11/2012 | Sung et al. | |
| 2014/0339913 A1* | 11/2014 | Tsuji | H02J 5/005 307/104 |
| 2015/0171519 A1 | 6/2015 | Han et al. | |
| 2016/0094046 A1* | 3/2016 | Kato | H02J 7/025 307/104 |
| 2016/0094082 A1 | 3/2016 | Ookawa et al. | |
| 2016/0372960 A1* | 12/2016 | Ritter | H02J 7/00304 |

FOREIGN PATENT DOCUMENTS

| | | |
|---|---|---|
| JP | 2014-207458 A | 10/2014 |
| JP | 2014-222707 A | 11/2014 |
| JP | 2015-088376 A | 5/2015 |
| JP | 2016-208524 A | 12/2016 |

OTHER PUBLICATIONS

Oct. 1, 2019 International Preliminary Report on Patentability issued in International Application No. PCT/JP2018/012834.

May 11, 2021 Office Action issued in Japanese Patent Application No. 2017-071263.

* cited by examiner

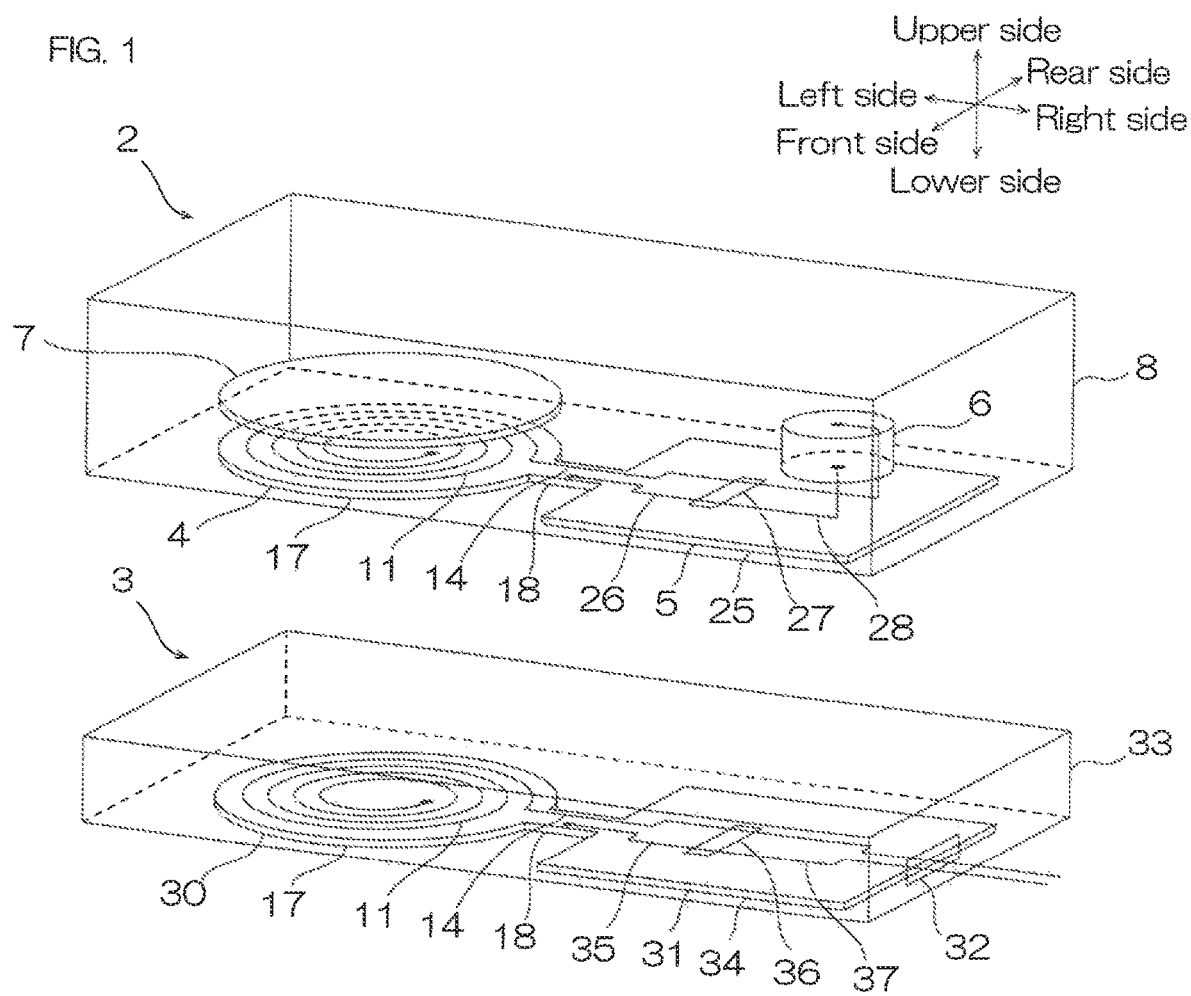

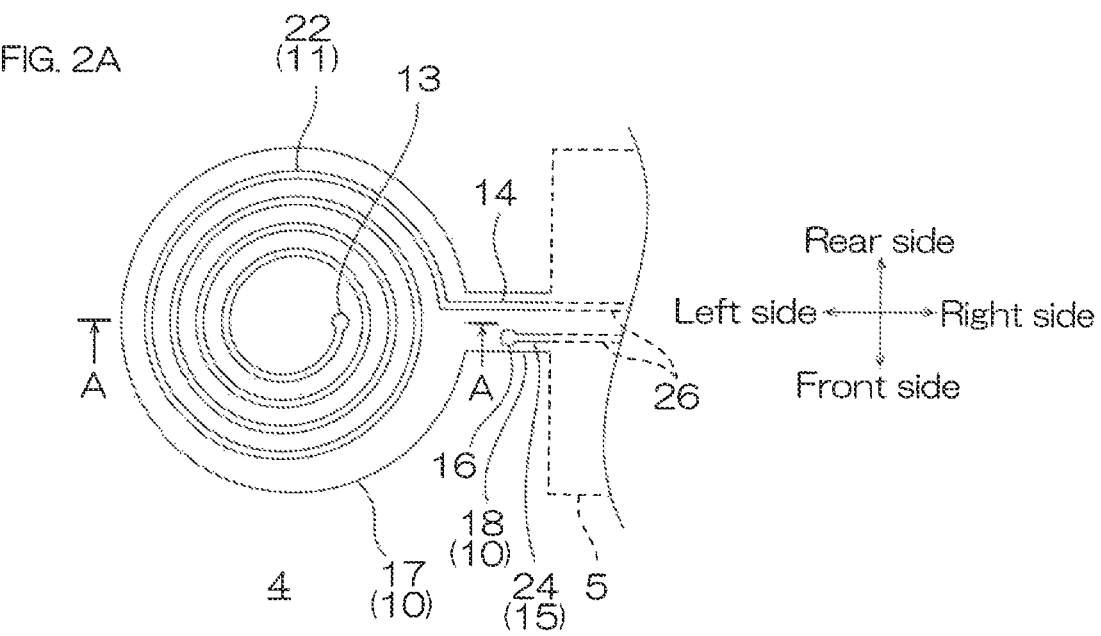
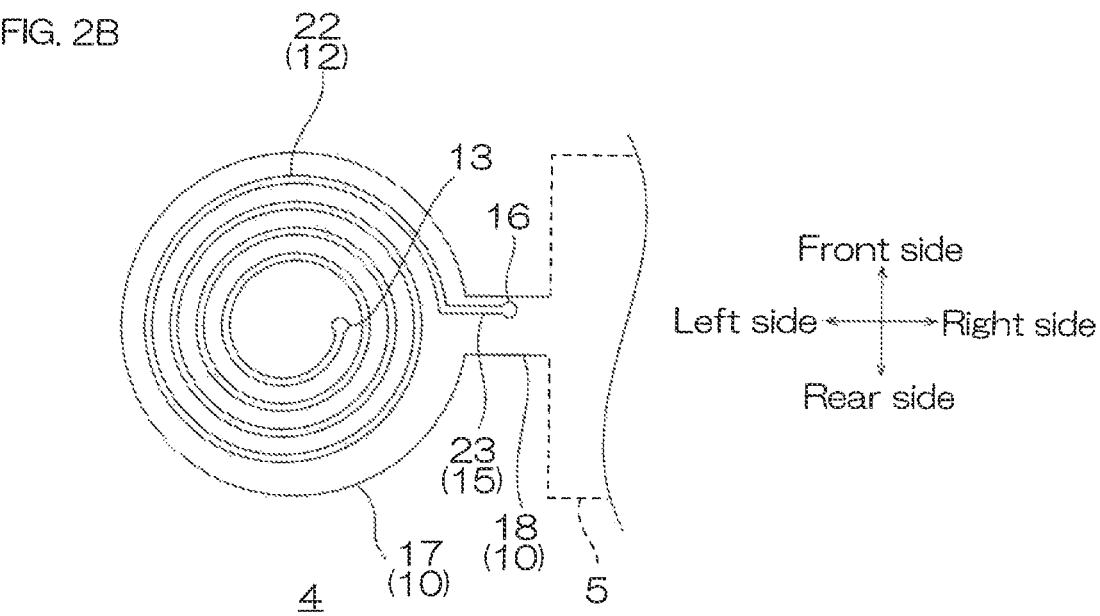

FIG. 5A
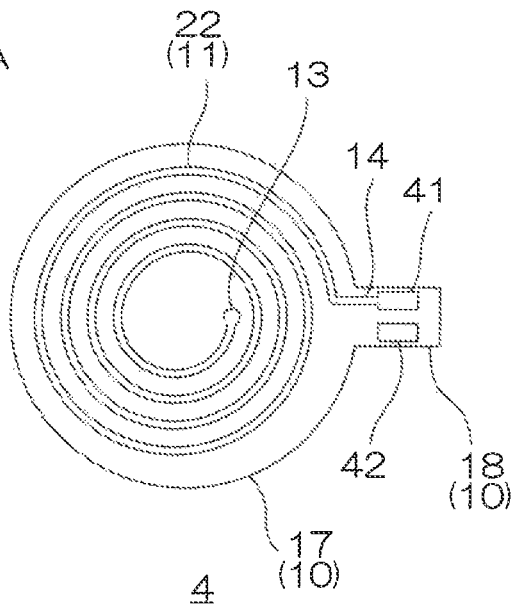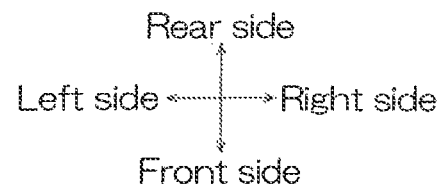
FIG. 5B
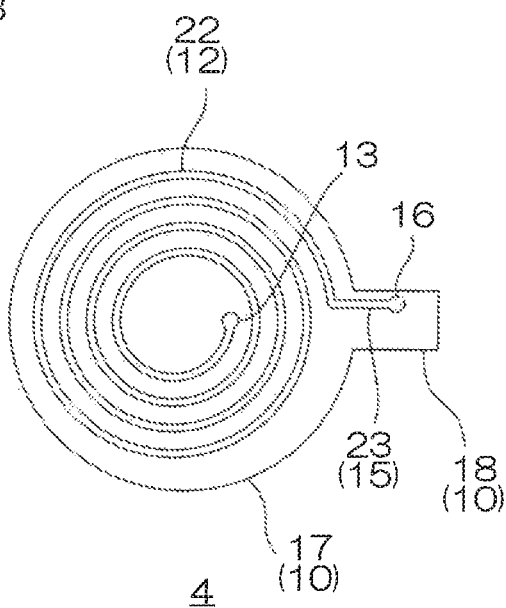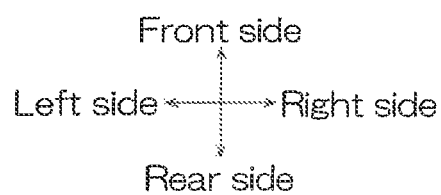

WIRELESS POWER TRANSMISSION SYSTEM AND SHEET COIL

TECHNICAL FIELD

The present invention relates to a wireless power transmission system and a sheet coil.

BACKGROUND ART

Conventionally, a wirelessly chargeable secondary battery unit has been known. Such a secondary battery unit can be wirelessly charged using a matching charger while the unit is attached to the electronic device, and therefore it is highly convenient.

Patent Document 1 discloses, for example, such a secondary battery unit. The battery unit described in Patent Document 1 includes a secondary battery, a power-receiving coil that receives electric power supplied from outside, and a circuit board that charges the secondary battery using the electric power received.

For the power-receiving coil used in this battery unit, a wound coil that is formed into a cyclic shape by winding a wire material such as copper wire is used. The wound coil is composed of a coil member including a copper wire and a cover layer protecting the copper wire, and is produced by fusing and fixing the cover layers that are adjacent to each other when winding and fixing the coil member.

CITATION LIST

Patent Document

Patent Document 1: Japanese Unexamined Patent Publication No. 2015-88376

SUMMARY OF THE INVENTION

Problem to be Solved by the Invention

Meanwhile, recently, increasing the frequency of the electric current has been examined, in view of transmitting highly efficient power.

However, when electric power with a high frequency of, for example, 1 MHz or more is transmitted using the wound coil described in Patent Document 1, disadvantages are caused in that the resistance value of the wound coil excessively increases. Then, power receiving efficiency is significantly reduced.

The present invention provides a wireless power transmission system that allows for transmission of electric power with a high frequency and has a power-receiving coil member with an excellent resistance value; and a sheet coil used in the wireless power transmission system.

Means for Solving the Problem

The present invention [1] includes a wireless power transmission system including a power-supplying device including an electronic oscillator that generates electric power having a frequency of 1 MHz or more and 5 MHz or less, and a power-supplying coil member in which the electric power flows; and a power-receiving device including a power-receiving coil member that is capable of generating power based on the magnetic field generating from the power-supplying coil member, wherein the power-receiving coil member is a sheet coil including an insulating layer and a first coil pattern disposed at one side of the insulating layer, the first coil pattern is composed of wires, and the wires are disposed in spaced apart relation from each other with a predetermined space provided therebetween in the radial direction of the first coil pattern.

The present invention [2] includes the wireless power transmission system described in [1], wherein in the first coil pattern, the wire has a width of 20 μm or more and 200 μm or less, and the space is 20 μm or more and 200 μm or less.

The present invention [3] includes the wireless power transmission system described in [1] or [2], wherein the sheet coil further includes a second coil pattern disposed at the other side of the insulating layer; the second coil pattern is composed of wires; and the wires of the second coil pattern are disposed in spaced apart relation from each other with a predetermined space provided therebetween in the radial direction of the second coil pattern.

The present invention [4] includes a sheet coil including an insulating layer and a first coil pattern disposed at one side of the insulating layer, wherein the first coil pattern is composed of wires, the wires are disposed in spaced apart relation from each other with a predetermined space provided therebetween in the radial direction of the first coil pattern, and the sheet coil receives electric power having a frequency of 1 MHz or more and 5 MHz or less.

The present invention [5] includes the sheet coil described in [4], wherein the sheet coil further includes a second coil pattern disposed at the other side of the insulating layer, the second coil pattern is composed of wires, and the wires of the second coil pattern are disposed in spaced apart relation from each other with a predetermined space provided therebetween in the radial direction of the second coil pattern.

Effects of the Invention

In the wireless power transmission system of the present invention including the sheet coil of the present invention, the power-supplying device having the electronic oscillator that generates electric power having a frequency of 1 MHz or more and 5 MHz or less, and a power-supplying coil member; and the power-receiving device having a power-receiving coil member are included. Therefore, electric power with a high frequency of 1 MHz or more and 5 MHz or less can be transmitted.

In the wireless power transmission system, the power-receiving coil member includes the insulating layer and first coil pattern composed of wires, and the wires are disposed in spaced apart relation from each other with a predetermined space provided therebetween in the radial direction of the first coil pattern. Therefore, particularly with an electric current with a frequency of 1 MHz or more and 5 MHz, repelling of the electric current flowing in the wire and the electric current flowing in the adjacent wire (proximity effect) is suppressed, and cross-sectional partial distribution of electric current flow in the wire can be suppressed. Therefore, increase in the resistance value of the power-receiving coil member can be suppressed.

BRIEF DESCRIPTION OF THE DRAWINGS

FIG. 1 shows a perspective view of the wireless power transmission system in an embodiment of the present invention.

FIGS. 2A-B are developed view of the power-receiving coil member of the wireless power transmission system shown in FIG. 1, FIG. 2A is a plan view thereof and FIG. 2B is a bottom view thereof.

FIGS. 5A-B show a modified example (power-receiving coil member is an independently a single member) of the power-receiving coil member of the present invention, FIG. 5A is a plan view and FIG. 5B is a bottom view.

DESCRIPTION OF THE EMBODIMENTS

Embodiment

Figure 3:
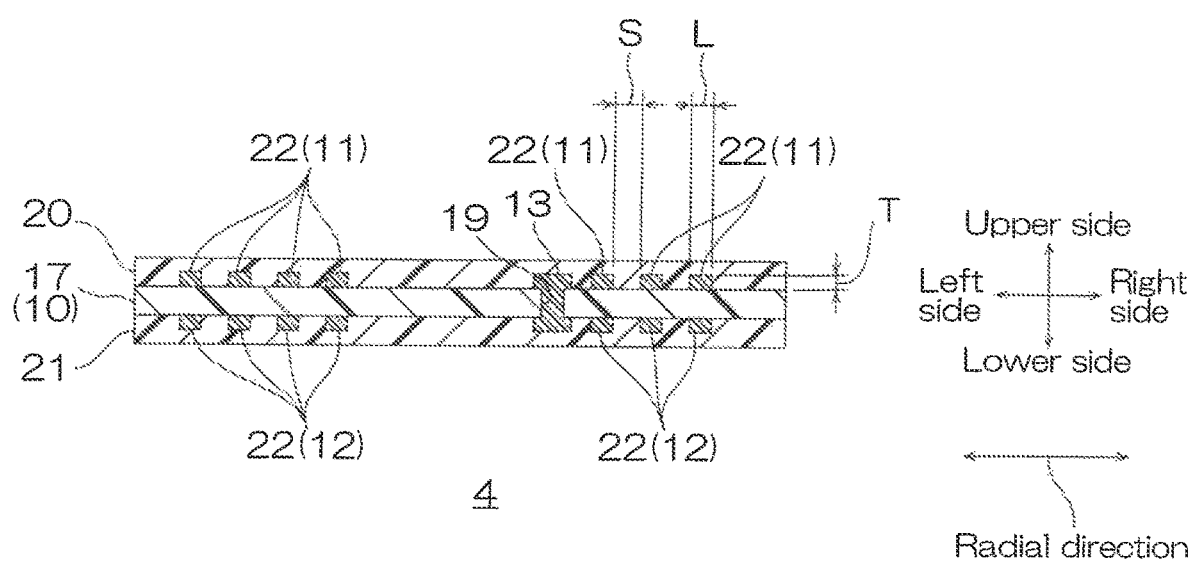
FIG. 3 shows a cross sectional view taken along A-A of the power-receiving coil member shown in FIG. 3A.

An embodiment of the present invention is described below with reference to drawings. In FIG. 2A, the paper-thickness direction is up-down direction (thickness direction, first direction), near side on paper surface is upper side (one side in thickness direction, one side in first direction), and far side on paper surface is lower side (the other side in thickness direction, the other side in first direction). In FIG. 2A, the left-right direction on paper surface is left-right direction (second direction orthogonal to first direction), left side on paper surface is left side (one side in second direction), and right side on paper surface is right side (the other side in second direction).

In FIG. 2A, the up-down direction on paper surface is front-rear direction (third direction orthogonal to first direction and second direction), lower side on paper surface is front side (one side in third direction), and upper side on paper surface is rear side (the other side in third direction). To be specific, directions are in accordance with the direction arrows in the figures. In FIG. 1 to FIG. 2B, the first insulating cover layer is omitted.

With reference to FIG. 1 to FIG. 4, an embodiment of the wireless power transmission system of the present invention is described.

As shown in FIG. 1, the wireless power transmission system 1 includes a power-receiving device 2 and a power-supplying device 3.

The power-receiving device 2 includes a power-receiving coil member 4, control circuit board 5, secondary battery 6, magnetic sheet 7, and power-receiving device housing 8.

The power-receiving coil member 4 is a sheet coil, and is a coil that receives electric power transmitted by the power-supplying device 3; to be specific, it is a coil that is capable of generating electricity (receiving electricity) based on the magnetic field generated by the power-supplying coil member 30 to be described later.

As shown in FIG. 3, the power-receiving coil member 4 includes an insulating base layer 10 as the insulating layer, a first coil pattern 11, a second coil pattern 12, a coil via portion 13, a first joint wire 14, a second joint wire 15, a joint via portion 16, a first insulating cover layer 20, and a second insulating cover layer 21.

As shown in FIG. 2A to FIG. 2B, the insulating base layer 10 has an outline shape of the power-receiving coil member 4, and has a coil base portion 17 and a joint base portion 18.

The coil base portion 17 has a generally circular shape in plan view. As shown in FIG. 3, a first via opening 19 penetrating in up-down direction (thickness direction) is formed at a generally center in plan view of the coil base portion 17. A coil via portion 13 is disposed at the first via opening 19 to be described later.

The joint base portion 18 has a generally rectangular shape extending in left-right direction in plan view. The left end of the joint base portion 18 is integrally continuous with the right end of the coil base portion 17, and the right end of the joint base portion 18 is integrally continuous with the left end of the control circuit insulating base layer 25 (described later) of the control circuit board 5. At a center in the left-right direction and front-rear direction of the joint base portion 18, a second via opening (not shown) penetrating in up-down direction is formed. A joint via portion 16 to be described later is disposed at the second via opening.

The insulating base layer 10 is formed from, for example, insulating materials such as synthetic resin including polyimide resin, polyamide-imide resin, acrylic resin, polyether nitrile resin, polyether sulfone resin, polyethylene terephthalate resin, polyethylene naphthalate resin, and poly vinyl chloride resin. Preferably, it is formed from polyimide resin.

The insulating base layer 10 has a thickness of, for example, 1 μm or more, preferably 20 μm or more, and for example, 100 μm or less, preferably 60 μm or less.

The first coil pattern 11 is disposed at the upper face (upper side surface, one side) of the coil base portion 17. To be specific, the first coil pattern 11 is disposed at the upper side of the coil base portion 17 so that the lower face of the first coil pattern 11 makes contact with the upper face of the coil base portion 17. The first coil pattern 11 is a coiled wire pattern composed of wires 22.

As shown in FIG. 2A, the first coil pattern 11 is formed into a swirl shape composed of a curve headed from the coil via portion 13 to the outside in radial direction in plan view. The first coil pattern 11 is formed into a swirl until reaching the peripheral end near the joint base portion 18, and is integrally continuous with the first joint wire 14 at the peripheral end near the joint base portion 18.

As shown in FIG. 3, the cross sectional shape of the wire 22 forming the first coil pattern 11 in the radial direction is formed into a generally rectangular shape.

The second coil pattern 12 is disposed at the lower face (lower side surface, the other side) of the coil base portion 17. To be specific, the second coil pattern 12 is disposed at the lower side of the coil base portion 17 so that the upper face of the second coil pattern 12 makes contact with the lower face of the coil base portion 17. The second coil pattern 12 is a coiled wire pattern composed of wires 22.

As shown in FIG. 2B, the second coil pattern 12 is formed into a swirl shape composed of a curve headed from the coil via portion 13 to the outside in radial direction in bottom view. The second coil pattern 12 is formed into a swirl shape until reaching the peripheral end near the joint base portion 18, and is integrally continuous with the second joint wire 15 at the peripheral end near the joint base portion 18.

The cross sectional shape of the wire 22 forming the second coil pattern 12 in the radial direction is formed into a generally rectangular shape.

The bottom view shape (swirl shape pattern) at the intermediate portion of the second coil pattern 12 is substantially the same as the plan view shape at the intermediate portion of the first coil pattern 11. That is, the width L of the wires 22 of the second coil pattern 12 and the space S between the wires 22 are substantially the same as the width L and the space S of the wire 22 of the first coil pattern 11, and the number of winding of the second coil pattern 12 is the same as the number of the winding of the first coil pattern 11.

In the first coil pattern 11 and the second coil pattern 12, the width L (radial direction length of wire 22) of the wire 22 is, for example, 5 μm or more, preferably 20 μm or more, and for example, 400 μm or less, preferably 200 μm or less.

In the first coil pattern 11 and the second coil pattern 12, the height (thickness) T of the wire 22 is, for example, 3 μm or more, preferably 10 μm or more, and for example, 200 μm or less, preferably 100 μm or less.

In the first coil pattern 11 and second coil pattern 12, the aspect ratio (L/T) of the width L to thickness T of the wire 22 is, for example, more than 1.0, preferably 2.0 or more, and for example, 10 or less, preferably 5.0 or less.

In the first coil pattern 11 and second coil pattern 12, the space S (radial direction length between the wires 22 adjacent to each other) between the wires 22 is, for example, 5 μm or more, preferably 20 μm or more, and for example, 400 μm or less, preferably 200 μm or less.

In the first coil pattern 11 and second coil pattern 12, the ratio (L/S) of the width L to space S is, for example, 0.5 or more, preferably 0.7 or more, more preferably 1.0 or more, and for example, 5.0 or less, preferably 3.0 or less, more preferably 2.0 or less.

In the first coil pattern 11 and second coil pattern 12, the coil is wound by a number of, for example, 1 or more, preferably 3 or more, and for example, 500 or less, preferably 300 or less, more preferably 100 or less.

The coil via portion 13 is disposed at a generally center in plan view of the coil base portion 17. The coil via portion 13 is disposed so as to include the first via opening 19 when projecting in up-down direction. The coil via portion 13 is formed into a generally circular shape in plan view, and includes a filling portion that fills inside the first via opening 19, an upper portion projecting from the filling portion at the upper face side of the insulating base layer 10, and a lower portion projecting from the filling portion at the lower face side of the insulating base layer 10. The coil via portion 13 electrically connects the first coil pattern 11 with the second coil pattern 12.

The first joint wire 14 is a wire that electrically connects the first coil pattern 11 and the control circuit 26. The first joint wire 14 is disposed at the upper face of the joint base portion 18. To be specific, the first joint wire 14 is disposed at the upper side of the joint base portion 18 so that the lower face of the first joint wire 14 is in contact with the upper face of the joint base portion 18. The first joint wire 14 is composed of the wire 22, and has a linear pattern extending in left-right direction. The left end of the first joint wire 14 is integrally continuous with the outer end edge of the first coil pattern 11, and the right end of the first joint wire 14 is integrally continuous with the left end of the control circuit 26.

The second joint wire 15 is a wire that electrically connects the second coil pattern 12 with the control circuit 26. The second joint wire 15 includes a second lower side joint wire 23 and a second upper side joint wire 24.

The second lower side joint wire 23 is disposed at the lower face of the joint base portion 18. The second lower side joint wire 23 is composed of the wire 22, and has a linear pattern extending in left-right direction. The left end of the second lower side joint wire 23 is integrally continuous with the outer end edge of the second coil pattern 12, and the right end of the second lower side joint wire 23 is integrally continuous with the joint via portion 16.

The second upper side joint wire 24 is disposed at the upper face of the joint base portion 18. The second upper side joint wire 24 is composed of the wire 22, and has a linear pattern extending in left-right direction. The left end of the second upper side joint wire 24 is integrally continuous with the joint via portion 16, and the right end of the second upper side joint wire 24 is integrally continuous with the left end of the control circuit 26.

The joint via portion 16 is disposed in proximity of a generally center in plan view of the coil base portion 17. The joint via portion 16 is disposed so as to include the second via opening when projected in up-down direction. The joint via portion 16 is formed into a generally circular shape in plan view, and includes a filling portion that fills inside the second opening, an upper portion projecting from the filling portion at the upper face side of the insulating base layer 10, and a lower portion projecting from the filling portion at the lower face side of the insulating base layer 10. The joint via portion 16 electrically connects the second lower side joint wire 23 with the second upper side joint wire 24.

For the materials that forms the wire 22 and the via portion (coil via portion 13 and joint via portion 16), for example, metal materials such as copper, silver, gold, nickel, solder, and alloys thereof are used. Preferably, copper is used.

The first insulating cover layer 20 is disposed at the upper side of the upper side wire (first coil pattern 11, first joint wire 14, and second upper side joint wire 24) and the via portion (13,16). To be specific, the first insulating cover layer 20 is disposed at the upper side of the upper side wire, via portion, and insulating base layer 10 so as to cover the upper face and the side face of the upper side wire and via portion, and to cover the upper face of the insulating base layer 10 exposed from the upper side wire and via portion.

The first insulating cover layer 20 has a generally circular shape in plan view. The first insulating cover layer 20 includes the upper side wire and the first insulating cover layer 20 is included in the insulating base layer 10 when projected in up-down direction.

The second insulating cover layer 21 is disposed at the lower side of the lower side wire (second coil pattern 12 and second lower side joint wire 23) and the via portion (13,16). To be specific, the second insulating cover layer 21 is disposed at the lower side of the lower side wire, via portion, and insulating base layer 10 so as to cover the lower face and side face of the lower side wire and via portion, and the lower face of the insulating base layer 10 exposed from the lower side wire and via portion.

The second insulating cover layer 21 has a generally circular shape in plan view. The second insulating cover layer 21 includes the lower side wire and the second insulating cover layer 21 is included in the insulating base layer 10 when projected in up-down direction.

The first insulating cover layer 20 and second insulating cover layer 21 are formed from the same material with the above-described insulating material for the insulating base layer 10, and preferably, it is formed from polyimide resin.

The first insulating cover layer 20 and second insulating cover layer 21 have a thickness of, for example, 2 μm or more, preferably 5 μm or more, and for example, 70 μm or less, preferably 60 μm or less.

The power-receiving coil member 4 can be produced, along with the control circuit board 5, for example, by a subtractive method or additive method. For example, an insulating base layer 10 including an opening is prepared, and at the same time with forming an upper side wire on the upper face thereof and a lower side wire on the lower face thereof by the subtractive method or additive method, a via portion is formed on the opening. Then, the first insulating cover layer 20 is formed on the upper face thereof, and the second insulating cover layer 21 is formed on the lower face thereof.

The control circuit board 5 is a flexible wired circuit board, and includes the control circuit insulating base layer 25 and the control circuit 26.

The control circuit insulating base layer 25 is an insulating layer that supports the control circuit 26. The control circuit insulating base layer 25 has a generally rectangular flat plate shape in plan view. The control circuit insulating base layer 25 is formed integrally and continuously with the insulating base layer 10. For the material for forming the control circuit insulating base layer 25, the same material for forming the insulating base layer 10 is used.

The control circuit 26 is a circuit that controls electric power from the power-receiving coil member 4 when receiving power. To be specific, when receiving power, it is a circuit that converts the alternating current form the power-receiving coil member 4 to direct current, and supplies it to the secondary battery 6. The control circuit 26 is disposed at the upper face of the control circuit insulating base layer 25. The control circuit 26 includes a control element 27 and a control circuit connection wire 28.

Examples of the control element 27 include a rectifier (AC/DC converter), transformer, and charge controller.

The control circuit connection wire 28 is a wire that electrically connects the power-receiving coil member 4, control element 27, and secondary battery 6.

To be specific, at two ends of the power-receiving coil member 4 side, one end of the control circuit connection wire 28 is integrally continuous with the right end of the first joint wire 14, and the other end of the control circuit connection wire 28 is integrally continuous with the right end of the second joint wire 15. At two ends of the secondary battery 6 side, one end of the control circuit connection wire 28 is in contact with the negative electrode terminal of the secondary battery 6, and the other end of the control circuit connection wire 28 is in contact with the positive electrode terminal of the secondary battery 6. The control circuit connection wire 28 is in contact with the control element 27.

The secondary battery 6 is a battery that is capable of charging and discharging, and examples thereof include a lithium ion secondary battery, nickel hydrogen secondary battery, and silver zinc secondary battery.

As shown in FIG. 1, a magnetic sheet 7 is disposed directly on the upper side of the power-receiving coil member 4, or disposed with a pressure sensitive adhesive layer or adhesive layer interposed therebetween, which is not shown. To be specific, the magnetic sheet 7 is disposed at the upper side of the power-receiving coil member 4 so that the magnetic sheet 7 and the power-receiving coil member 4 are in parallel with each other in the surface direction.

The magnetic sheet 7 has a generally circular flat plate shape in plan view, and formed into the same size and shape as those of the power-receiving coil member 4 in plan view.

The magnetic sheet 7 is a sheet containing a magnetic substance, and for example, a magnetic substance particles-containing resin sheet and magnetic substance sintering sheet are used.

The magnetic substance particles-containing resin sheet is formed into a sheet shape from a composition containing the magnetic substance particles and a resin component.

Examples of the magnetic substance forming the magnetic substance particles include soft magnetic substance and hard magnetic substance, and preferably, the soft magnetic substance is used. Examples of the soft magnetic substance include magnetic stainless steel (Fe—Cr—Al—Si alloy), Sendust (Fe—Si—Al alloy), permalloy (Fe—Ni alloy), silicon copper (Fe—Cu—Si alloy), Fe—Si alloy, Fe—Si—B (—Cu—Nb) alloy, Fe—Si—Cr—Ni alloy, Fe—Si—Cr alloy, Fe—Si—Al—Ni—Cr alloy, and ferrite.

Examples of the resin component include rubber polymers such as butadiene rubber, styrene-butadiene rubber, isoprene rubber, acrylonitrile rubber, poly acrylate, ethylene-vinyl acetate copolymer, and styrene acrylate copolymer. Examples of the resin component include, in addition to the above-described ones, thermosetting resin such as epoxy resin, phenol resin, melamine resin, and urea resin, and thermoplastic resin such as polyolefin, polyvinyl acetate, polyvinyl chloride, polystyrene, polyamide, polycarbonate, and polyethylene terephthalate.

Sintered magnetic substance is the above-described magnetic substance sintered into a sheet, and for example, a ferrite sheet is used.

The magnetic sheet 7 has a thickness of, for example, 10 μm or more, preferably 50 μm or more, and for example, 500 μm or less, preferably 300 μm or less.

As shown in FIG. 1, the power-receiving device housing 8 has a box shape, and accommodates the power-receiving coil member 4, control circuit board 5, secondary battery 6, and magnetic sheet 7 therein.

(Power-Supplying Device)

As shown in FIG. 1, the power-supplying device 3 includes a power-supplying coil member 30, electronic oscillator board 31, external power source connector 32, and power-supplying device housing 33.

The power-supplying coil member 30 has the same configuration as that of the power-receiving coil member 4. That is, the power-supplying coil member 30 includes an insulating base layer 10, first coil pattern 11, second coil pattern 12, coil via portion 13, first joint wire 14, second joint wire 15, joint via portion 16, first insulating cover layer 20, and second insulating cover layer 21.

The electronic oscillator board 31 includes an electronic oscillator insulating base layer 34 and electronic oscillator 35.

The electronic oscillator insulating base layer 34 is an insulating layer supporting the electronic oscillator 35. The electronic oscillator insulating base layer 34 has a generally rectangular flat plate shape in plan view. The electronic oscillator insulating base layer 34 is formed integrally and continuously with the insulating base layer 10. For the material for forming the electronic oscillator insulating base layer 34, the same material for forming the insulating base layer 10 is used.

The electronic oscillator 35 is a circuit that generates electric power having a frequency of 1 MHz or more and 5 MHz or less. The electronic oscillator 35 is disposed at the upper face of the electronic oscillator insulating base layer 34. The electronic oscillator 35 includes an oscillator element 36 and electronic oscillator connection wire 37.

The oscillator element 36 can be any of those used for an LC electronic oscillator, CR electronic oscillator, liquid crystal electronic oscillator, and switching circuit.

The electronic oscillator connection wire 37 is a wire that electrically connects the power-supplying coil member 30, oscillator element 36, and external power source connector 32.

To be specific, at two ends of the power-supplying coil member 30 side, one end of the electronic oscillator connection wire 37 is integrally continuous with the right end of the first joint wire 14 of the power-supplying coil member 30, and the other end of the electronic oscillator connection wire 37 is integrally continuous with the right end of the second joint wire 15 of the power-supplying coil member 30. The electronic oscillator connection wire 37 is connected with the external power source connector 32 at the opposite ends of the power-supplying coil member 30 side. The electronic oscillator connection wire 37 is connected with the oscillator element 36 at a point.

The external power source connector 32 is capable of connecting with the external power source 40, and for example, an AC adapter and USB terminal are used.

The power-supplying device housing 33 has a box shape, and accommodates the power-supplying coil member 30, electronic oscillator board 31, and external power source connector 32 therein, and allows a portion of the external power source connector 32 to expose.

(Wireless Power Transmission System)

Figure 4:
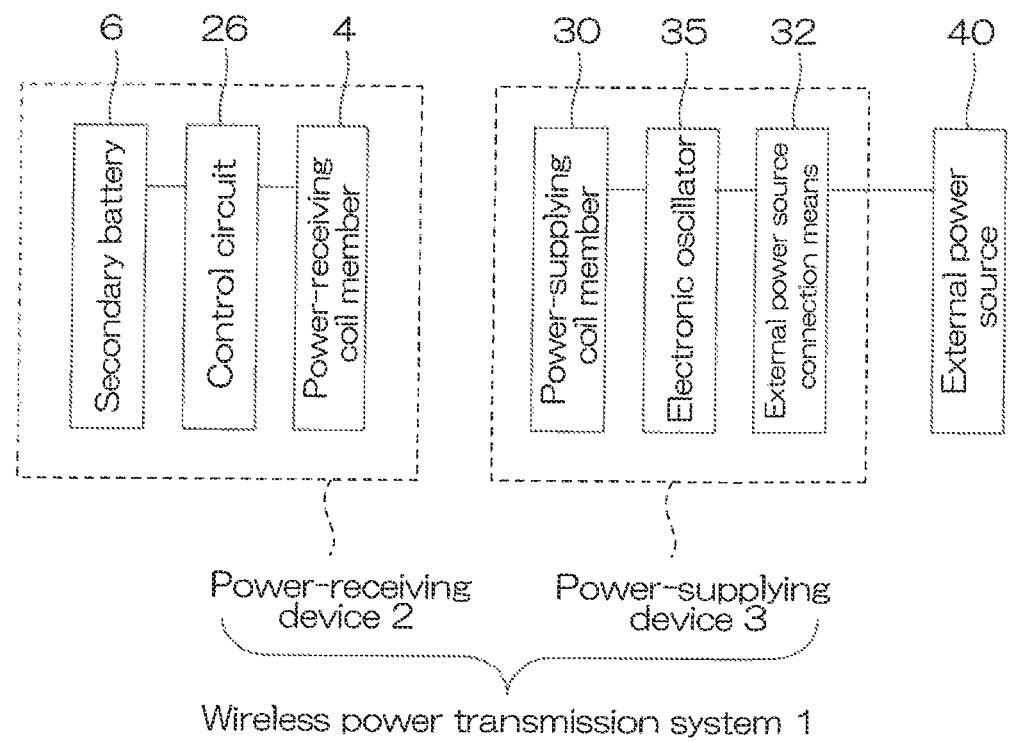
FIG. 4 shows a block diagram of the wireless power transmission system shown in FIG. 1.

The wireless power transmission system 1 wirelessly transmits electric power from the power-supplying device 3 to the power-receiving device 2. That is, as shown in FIG. 4, in the power-supplying device 3, the electric power supplied from the external power source 40 to the electronic oscillator 35 is converted to electric power having a frequency of 1 MHz or more and 5 MHz or less by the electronic oscillator 35, and magnetic field is generated from the power-supplying coil member 30. The power-receiving coil member 4 receives electric power having a frequency of 1 MHz or more and 5 MHz or less by the effects of the magnetic field. The received electric power is converted to a direct current of a desired voltage and controlled by the control circuit 26, and supplied to the secondary battery 6. In this manner, the secondary battery 6 is charged.

In the charged secondary battery 6, the positive electrode terminal of the secondary battery 6 is directly or indirectly connected with the positive electrode terminal of an external electronic device (not shown), thereby electrically connecting their terminals. Also, the negative electrode terminal of the secondary battery 6 is directly or indirectly connected with the negative electrode terminal of an external electronic device, thereby electrically connecting their terminals. In this manner, the received electric power is discharged by the secondary battery 6, and an external electronic device can be driven.

Transmission of the electric power by magnetic field between the power-receiving coil member 4 and the power-supplying coil member 30 can be done by any of the magnetic field resonance method and electromagnetic induction method. Preferably, in view of longer transmission distance, and highly efficient electric power transmission even with coil mispositioning, the magnetic field resonance method is used.

(Use)

The wireless power transmission system 1 and power-receiving coil member 4 (sheet coil) used therein can be widely used for electronic devices in which conventional secondary batteries and primary batteries are used. Examples of the electronic device (external electronic device) include wearables such as hearing aids, smart glasses, and smart watches; speakers; and medical devices.

The wireless power transmission system 1 includes the power-supplying device 3 having the electronic oscillator 35 that generates electric power having a frequency of 1 MHz or more and 5 MHz or less and the power-supplying coil member 30. It also includes the power-receiving device 2 having the power-receiving coil member 4 that is capable of generating power by the magnetic field generated from the power-supplying coil member 30.

That is, the wireless power transmission system 1 can transmit wirelessly the electric power with a high frequency of 1 MHz or more and 5 MHz or less (preferably 1.5 MHz or more and 4 MHz or less, more preferably 1.5 MHz or more and 3 MHz or less) from the power-supplying device 3 to the power-receiving device 2.

In the wireless power transmission system 1, the power-receiving coil member 4 includes the insulating base layer 10 and the first coil pattern 11 composed of wires 22, and the wire 22 are disposed with a predetermined space S provided therebetween in the radial direction of the first coil pattern 11.

Therefore, with a high frequency electric current of particularly 1 MHz or more and 5 MHz or less, phenomenon of repelling of electric current flowing in the adjacent wires 22 (proximity effect) in the electric current flowing in the wires 22 can be suppressed. Therefore, in a cross-section of the wire 22, partial distribution of electric current flow can be suppressed, and decrease in the area of the electric current flow can be suppressed. Thus, increase in the resistance value of the power-receiving coil member 4 can be suppressed.

Therefore, the wireless power transmission system 1 can transmit electric power with a high frequency of 1 MHz or more and 5 MHz or less highly efficiently.

With the wireless power transmission system 1, the wire 22 of the first coil pattern 11 has a width L of 20 μm or more and 200 μm or less, and a space S of 20 μm or more and 200 μm or less. Therefore, proximity effect can be suppressed even more, and increase in the resistance value of the power-receiving coil member 4 can be suppressed. The size of the power-receiving coil member 4 can be a compact size, and power receiving efficiency can be improved.

With the wireless power transmission system 1, the power-receiving coil member 4 further includes the second coil pattern 12 disposed at the lower face of the insulating base layer 10. The second coil pattern 12 is composed of wires 22, and the wires 22 of the second coil pattern 12 are disposed with a predetermined space S provided therebetween in the radial direction of the second coil pattern 12.

Therefore, with a compact shape, the number of winding of the power-receiving coil member 4 that can suppress proximity effect can be increased. Therefore, the power receiving efficiency can be improved even more with a compact shape.

The wireless power transmission system 1 further includes the magnetic sheet 7. Therefore, when the power-receiving coil member 4 receives electric power from the power-supplying device 3, while suppressing proximity effect, the electric power can be converged to the power-receiving coil member 4. Therefore, electric power receiving efficiency can be improved.

The power-receiving coil member 4, i.e., sheet coil, includes an insulating base layer 10 and a first coil pattern 11 disposed on the upper face thereof. Therefore, proximity effect caused at the time when electric power having a frequency of 1 MHz or more and 5 MHz or less is flown in the wires 22 of the first coil pattern 11 can be suppressed. Therefore, increase in the resistance value of the power-receiving coil member can be suppressed.

The power-receiving coil member 4 further includes a second coil pattern 12. Therefore, power receiving efficiency can be improved even more with a compact shape.

MODIFIED EXAMPLE

In the embodiment shown in FIG. 1, in the power-receiving device 2, the power-receiving coil member 4 and control circuit board 5 are integrally formed, but for example, the power-receiving coil member 4 and the control circuit board 5 can be formed from different components.

In this embodiment, the power-receiving coil member 4 is independent as an individual component, as shown in FIG. 5A to FIG. 5B. The power-receiving coil member 4 further includes a plurality of (two) terminals (first terminal 41 and second terminal 42) for electrically connecting with the control circuit 26 of the control circuit board 9.

The first terminal 41 is disposed on the upper face of the joint base portion 18. To be specific, it is disposed at the right end of the joint base portion 18. The first terminal 41 has a generally rectangular shape in plan view, and the left end thereof is integrally continuous with the right end of the first joint wire 14.

The second terminal 42 is disposed at the upper face of the joint base portion 18. To be specific, the second terminal 42 is disposed at the front side of the first terminal 41, and the right end of the joint base portion 18. The second terminal 42 has a generally rectangular shape in plan view. It includes a joint via portion 16 when projected in up-down direction. That is, the second terminal 42 is integrally continuous with the joint via portion 16.

The control circuit board 9 is independent as one component, although not shown, and further includes a plurality of (two) terminals to electrically connect with the first terminal 41 and the second terminal 42.

In the embodiment shown in FIG. 1, the insulating base layer 10 of the power-receiving coil member 4 is formed into a generally circle shape in plan view, and for example, although not shown, it can be formed into a generally rectangular shape in plan view.

In the embodiment shown in FIG. 1, the first coil pattern 11 and the second coil pattern 12 have a swirl shape composed of curves, but for example, although not shown, the swirl can be made into a rectangle.

In the embodiment shown in FIG. 1, the intermediate portion of the second coil pattern 12 is in correspondence with the intermediate portion of the first coil pattern 11 when projected in up-down direction, but for example, although not shown, the intermediate portion of the second coil pattern 12 does not have to be in correspondence with the intermediate portion of the first coil pattern 11 in up-down direction (thickness direction). That is, the width L of the wire 22 and the space S between the wires 22 of the second coil pattern 12 can be different from the width L of the wire 22 and the space S between the wire 22 of the first coil pattern 11, and the number of winding of the second coil pattern 12 can be different from the number of winding of the first coil pattern 11.

In the embodiment shown in FIG. 1, the power-supplying coil member 30 is the sheet coil that is the same as the power-receiving coil member 4, but for example, although not shown, the power-supplying coil member 30 can be a coil different from the power-receiving coil member 4, and for example, it can be a wound coil.

EXAMPLES

Next, the present invention is further described based on Examples and Comparative Examples below. The present invention is however not limited by the following Examples and Comparative Examples. The specific numerical values in mixing ratio (content ratio), physical property values, and parameters used in the following description can be replaced with upper limit values (numerical values defined with "or less" or "below") or lower limit values (numerical values defined with "or more" or "above") of corresponding numerical values in mixing ratio (content ratio), physical property values, and parameter described in the above-described "DETAILED DESCRIPTION OF THE INVENTION".

Example 1

A copper-clad laminate plate in which a copper layer (thickness 35 µm) was laminated on both sides of an insulating base layer (thickness 25 µm) composed of polyimide was prepared. On the copper layer of the copper-clad laminate plate, a first coil pattern, second coil pattern, first joint wire, second joint wire, first terminal, and second terminal were formed by subtractive method. Then, a coil via portion and joint via portion were formed by through hole plating. In this manner, a power-receiving coil member shown in FIG. 5 was made.

The first coil pattern and second coil pattern had a plan view shape of swirl composed of curves, and the copper wire was wound in the coil pattern by 13 times, the wire width L was 200 µm, the space S between the wire was 100 µm, and the wire height T was 50 µm.

Comparative Example 1

For Comparative Example, a commercially available wound coil (wound coil with which magnetic sheet was removed from coil unit [WR202010-18M8-ID] (manufactured by TDK)) was used as a power-receiving coil member of Comparative Example 1, in which a cover copper wire, in which the copper wire is covered with a cover insulating layer, is wound into swirl. The wound coil was a 2-layer structure, and in one layer, the copper wire was wound by 13 times, and the copper wire (circular in cross section) had a diameter of 300 µm.

Evaluation

The power-receiving coil member of Examples and Comparative Examples were electrically connected to a network analyzer (manufactured by Keysight Technologies, [E5061B]), and the resistance value at a frequency of 100 kHz to 10 MHz was measured with an impedance analyzer mode. The measurement graph is shown in FIG. 6.

Figure 6:
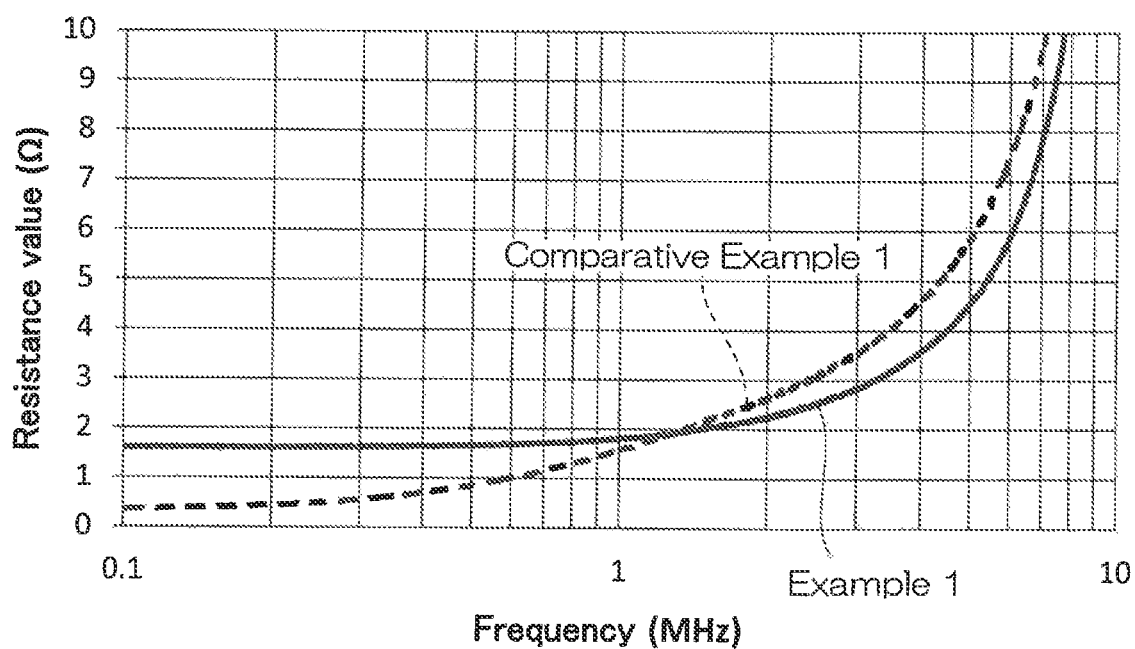
FIG. 6 shows a graph showing the resistance value measured of the power-receiving coil member of Examples and Comparative Examples.

As is clear from FIG. 6, the power-receiving coil member of Example 1 had a lower resistance value than that of the power-receiving coil member of Comparative Example 1 in the frequency range of electric power of near 1 MHz or more (particularly, 1.5 MHz or more). In the frequency range of electric power of 5 MHz or less (particularly, 4 MHz or less), the resistance value was low without excessive increase.

These results show the following. In the power-receiving coil member (wound coil) of Comparative Example 1, the copper wire had a diameter (and cross-sectional area) sufficiently larger than the thickness of the insulating cover layer, and the copper wires are disposed adjacently with an insulating cover layer interposed therebetween. Therefore, the electric current flowing in the copper wire repels from each other (proximity effect), and therefore the electric current is not homogenously distributed to the entire copper wire cross section, but it flows partially in the cross section. As a result, the electric current with a frequency of 1 MHz or more and 5 MHz does not flow in the copper wire smoothly, and the resistance value of the copper wire is high.

In contrast, in the power-receiving coil member (sheet coil) of Example 1, the wires in the first coil pattern and second coil pattern are disposed in sufficiently spaced apart relation from adjacent wires. Therefore, phenomenon of repelling of the electric current flowing in the wires of the first coil pattern and second coil pattern with the electric current flowing in the adjacent wires (proximity effect) is suppressed. Therefore, partial distribution of electric current flow at the wire cross section is suppressed, and reduction in the area where the electric current is flowing is suppressed. Therefore, increase in the resistance value of the power-receiving coil member 4 is suppressed.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The wireless power transmission system and sheet coil of the present invention can be applied in various industrial products, and for example, can be suitably used in an electronic device in which a secondary battery or primary battery is used.

DESCRIPTION OF REFERENCE NUMERALS 1 wireless power transmission system
2 power-receiving device
3 power-supplying device
4 power-receiving coil member
10 insulating base layer
11 first coil pattern
12 second coil pattern
22 wire
30 power-supplying coil member
35 electronic oscillator

The invention claimed is:

1. A wireless power transmission system comprising:
a power-supplying device including an electronic oscillator that generates electric power having a frequency of 1 MHz or more and 5 MHz or less, and a power-supplying coil member in which the electric power flows; and
a power-receiving device including a power-receiving coil member that is capable of generating electric power based on a magnetic field generating from the power-supplying coil member,
wherein the power-receiving coil member is a sheet coil including an insulating layer and a first coil pattern disposed at one side of the insulating layer, and
the first coil pattern is composed of and formed by a continuous wire, on the one side of the insulating layer, forming a swirl shape by being curved from a coil via portion, which is an innermost point of the swirl shape, to outside in a radial direction while maintaining a constant predetermined space between adjacent portions of the continuous wire that forms the swirl shape.

2. The wireless power transmission system according to claim 1, wherein
in the first coil pattern, the continuous wire has a width of 20 µm or more and 200 µm or less, and the predetermined space is 20 µm or more and 200 µm or less.

3. The wireless power transmission system according to claim 1, wherein
the coil via portion penetrates the insulating layer from the one side to the other side of the insulating layer;
the sheet coil further includes a second coil pattern disposed at the other side of the insulating layer;
the second coil pattern is composed of and formed by a continuous wire, on the other side of the insulating layer, forming a swirl shape by being curved from the coil via portion to outside in a radial direction while maintaining a constant predetermined space between adjacent portions of the continuous wire that forms the swirl shape; and
the coil via portion electrically connects the first coil pattern with the second coil pattern.

4. The wireless power transmission system according to claim 1, wherein
a ratio of a width of the continuous wire to the predetermined space is 1 or more and 2 or less.

5. A sheet coil comprising:
an insulating layer and a first coil pattern disposed at one side of the insulating layer,
wherein the first coil pattern is composed of and formed by a continuous wire, on the one side of the insulating layer, forming a swirl shape by being curved from a coil via portion, which is an innermost point of the swirl shape, to outside in a radial direction while maintaining a constant predetermined space between adjacent portions of the continuous wire that forms the swirl shape, and
the sheet coil receives electric power having a frequency of 1 MHz or more and 5 MHz or less.

6. The sheet coil according to claim 5, wherein
the coil via portion penetrates the insulating layer from the one side to the other side of the insulating layer;
the sheet coil further includes a second coil pattern disposed at the other side of the insulating layer,
the second coil pattern is composed of and formed by a continuous wire, on the other side of the insulating layer, forming a swirl shape by being curved from the coil via portion to outside in a radial direction while maintaining a constant predetermined space between adjacent portions of the continuous wire that forms the swirl shape; and
the coil via portion electrically connects the first coil pattern with the second coil pattern.

* * * * *